US012311326B2

(12) United States Patent
Saidman et al.

(10) Patent No.: US 12,311,326 B2
(45) Date of Patent: May 27, 2025

(54) FOAM MIXING SYSTEM

(71) Applicant: NORDSON CORPORATION, Westlake, OH (US)

(72) Inventors: Laurence B Saidman, Duluth, GA (US); Warren N. Strong, Cumming, GA (US)

(73) Assignee: Nordson Corporation, Westlake, OH (US)

( * ) Notice: Subject to any disclaimer, the term of this patent is extended or adjusted under 35 U.S.C. 154(b) by 772 days.

(21) Appl. No.: 17/611,671

(22) PCT Filed: May 15, 2020

(86) PCT No.: PCT/US2020/033083
§ 371 (c)(1),
(2) Date: Nov. 16, 2021

(87) PCT Pub. No.: WO2020/236565
PCT Pub. Date: Nov. 26, 2020

(65) Prior Publication Data
US 2022/0212154 A1 Jul. 7, 2022

Related U.S. Application Data

(60) Provisional application No. 62/860,255, filed on Jun. 12, 2019, provisional application No. 62/849,228, filed on May 17, 2019.

(51) Int. Cl.
*B01F 27/00* (2022.01)
*B01F 23/235* (2022.01)
(Continued)

(52) U.S. Cl.
CPC ...... *B01F 27/2711* (2022.01); *B01F 23/2351* (2022.01); *B01F 27/2722* (2022.01); *B01F 2101/36* (2022.01); *B01F 2215/0481* (2013.01)

(58) Field of Classification Search
CPC .............. B01F 27/2711; B01F 27/2722; B01F 23/2351; B01F 2215/0481
See application file for complete search history.

(56) References Cited

U.S. PATENT DOCUMENTS 3,231,242 A 1/1966 Schrier
4,092,738 A 5/1978 Doom
(Continued)

FOREIGN PATENT DOCUMENTS

CN 1473069 A 2/2004
CN 101306332 A 11/2008
(Continued)

OTHER PUBLICATIONS

"High Shear Mixers—Common Models"; https://www.highshearmixers.com/models.asp; Charles Ross & Son Company; 2019; accessed May 16, 2022; one page.
(Continued)

*Primary Examiner* — Anshu Bhatia
(74) *Attorney, Agent, or Firm* — BakerHostetler

(57) ABSTRACT

A mixing system mixes liquid adhesive and gas to create a solution. The mixing system it a manifold defining an adhesive input that receives the liquid adhesive, a gas input that receives the gas, a mixing chamber in fluid communication with the adhesive and gas inputs, an output that outputs the solution, and an output passage extending from the mixing chamber to the output. The mixing system also includes a rotor that rotates within the mixing chamber about a longitudinal axis so as to mix the solution, a motor that rotates the rotor, and a static mixer positioned within the output passage that statically mixes the solution flowing through the output passage.

20 Claims, 11 Drawing Sheets

(51) Int. Cl.
*B01F 27/271* (2022.01)
*B01F 27/272* (2022.01)
*B01F 101/36* (2022.01)

(56) References Cited

U.S. PATENT DOCUMENTS

| | | | |
|---|---|---|---|
| 4,281,937 | A | 8/1981 | Ferri et al. |
| 4,718,771 | A | 1/1988 | Asai et al. |
| 5,785,509 | A | 7/1998 | Harris et al. |
| 6,354,729 | B1 | 3/2002 | Brown |
| 2004/0052156 | A1 | 3/2004 | Brown |
| 2004/0219079 | A1 | 11/2004 | Hagen et al. |
| 2005/0094482 | A1* | 5/2005 | Foster .................. B01F 27/272 366/101 |
| 2005/0169101 | A1 | 8/2005 | Brown |
| 2005/0214109 | A1 | 9/2005 | Grande et al. |
| 2009/0001188 | A1 | 1/2009 | Hassan et al. |
| 2009/0079107 | A1 | 3/2009 | Abiru |
| 2009/0175121 | A1 | 7/2009 | Rausch et al. |
| 2010/0163640 | A1 | 7/2010 | Ganzer |
| 2012/0308852 | A1 | 12/2012 | Kono |
| 2013/0107660 | A1 | 5/2013 | Pappalardo |
| 2013/0329517 | A1 | 12/2013 | Linne et al. |
| 2014/0356512 | A1 | 12/2014 | Gupta et al. |
| 2015/0078113 | A1 | 3/2015 | Gillis et al. |
| 2016/0185624 | A1 | 6/2016 | Miller et al. |
| 2016/0228896 | A1 | 8/2016 | Jones |
| 2018/0295854 | A1 | 10/2018 | Clavier et al. |
| 2018/0369765 | A1 | 12/2018 | Maier |

FOREIGN PATENT DOCUMENTS

| | | | |
|---|---|---|---|
| CN | 101391188 | A | 3/2009 |
| CN | 101462982 | A | 6/2009 |
| CN | 103534016 | A | 1/2014 |
| CN | 103906562 | A | 7/2014 |
| CN | 104411393 | A | 3/2015 |
| CN | 105855073 | A | 8/2016 |
| CN | 108135205 | A | 6/2018 |
| DE | 3130968 | A1 | 2/1983 |
| DE | 29709060 | U1 | 7/1997 |
| DE | 102017113890 | A1 | 12/2018 |
| EP | 1435267 | A1 | 7/2004 |
| GB | 0894627 | A | 4/1962 |
| JP | 62-044409 | A | 2/1987 |
| JP | 04-056734 | U | 5/1992 |
| JP | 07-256072 | A | 10/1995 |
| JP | 2008-207176 | A | 9/2008 |
| JP | 2012-250186 | A | 12/2012 |
| JP | 2015-517399 | A | 6/2015 |
| WO | 94/13395 | A1 | 6/1994 |
| WO | 2018/197493 | A1 | 11/2018 |

OTHER PUBLICATIONS

"Oakes Continuous Mixer with Hopper, Model: C 14 MF 15 1"; https://bakeryequipment.com/productdetail.php?ProductID=24250; Bakery Equipment.com, Inc .; 2002-2014; accessed May 16, 2021; 3 pages.

"SureFoam™ Dispensing System"; Nordson Corporation; © 2018; 2 pages.

IPEA/409—International Preliminary Report on Patentability Mailed on Dec. 2, 2021 for WO Application No. PCT/US20/033083.

ISA/206—Invitation to Pay Additional Fees Mailed on Sep. 4, 2020 for WO Application No. PCT/US20/033083.

ISA/220—Notification of Transmittal or Search Report and Written Opinion of the ISA, or the Declaration Mailed on Dec. 7, 2020 for WO Application No. PCT/US20/033083.

* cited by examiner

FOAM MIXING SYSTEM

CROSS-REFERENCE TO RELATED APPLICATIONS

This application is a National Stage Application of International Patent Application No. PCT/US2020/033083, filed May 15, 2020, which claims the benefit of U.S. Provisional Patent Application No. 62/849,228, filed May 17, 2019, and U.S. Provisional Application No. 62/860,255, filed Jun. 12, 2019 the entire disclosures of each of which are hereby incorporated by reference as if set forth in their entirety herein.

TECHNICAL FIELD

This application generally relates to mixing systems configured to mix a solution comprising a liquid adhesive and gas, and, more particularly, to mixing systems including a rotatable rotor having a plurality of teeth for mixing the solution.

BACKGROUND

Hot melt thermoplastic adhesives are used in a number of applications such as packaging and product assembly. In conventional hot melt adhesive foam dispensing systems, a gear pump supplies a solution comprising an adhesive and gas to an adhesive dispenser, which can be referred to as a gun. The gun contains a valve at an outlet nozzle through which the solution is dispensed to atmospheric pressure. When the solution is dispensed, the gas is released from the solution to become entrapped in the adhesive to form a foam on a substrate to which the adhesive is applied.

During mixing, the gas can form large bubbles within the solution, which prevents the gas and adhesive from becoming adequately mixed. As a result, foam mixing systems can be utilized to break up the bubbles and create a more homogenous adhesive and gas solution. Such mixing systems can utilize static mixers and/or active mixers so as to effectively mix the solution. Though active mixers including rotating parts can be effective in mixing the solution, they may require such increased rotational speeds to perform effective mixing that certain components, such as seals, may fail often and require frequent replacement, which leads to production downtime and increased costs. Further, such mixers can also require increased power to sufficiently mix the solution, further adding to production costs.

As a result, there is a need for a rotating mixer that can effectively mix an adhesive and gas solution at lower rotational speeds.

SUMMARY

An embodiment of the present disclosure is mixing system configured to mix liquid adhesive and gas to create a solution. The mixing system includes a manifold defining an adhesive input configured to receive the liquid adhesive, a gas input configured to receive the gas, a mixing chamber in fluid communication with the adhesive and gas inputs, an output configured to output the solution, and an output passage extending from the mixing chamber to the output. The mixing system also includes a rotor configured to rotate within the mixing chamber about a longitudinal axis so as to mix the solution, a motor configured to rotate the rotor, and a static mixer positioned within the output passage and configured to statically mix the solution flowing through the output passage.

Another embodiment of the present disclosure is a mixing system configured to mix a solution comprising a liquid adhesive and a gas. The mixing system includes a manifold defining an input configured to receive the solution, a mixing chamber in fluid communication with the input, and an output in fluid communication with the mixing chamber and configured to output the solution. The mixing system also includes a rotor configured to rotate within the mixing chamber so as to mix the solution, and a motor configured to rotate the rotor at less than 100 revolutions per minute (RPM) such that the rotor mixes the solution at a shear rate of greater than 100 reciprocal seconds.

BRIEF DESCRIPTION OF THE DRAWINGS

The foregoing summary, as well as the following detailed description, will be better understood when read in conjunction with the appended drawings. The drawings show illustrative embodiments of the disclosure. It should be understood, however, that the application is not limited to the precise arrangements and instrumentalities shown.

DETAILED DESCRIPTION

Figure 1A:
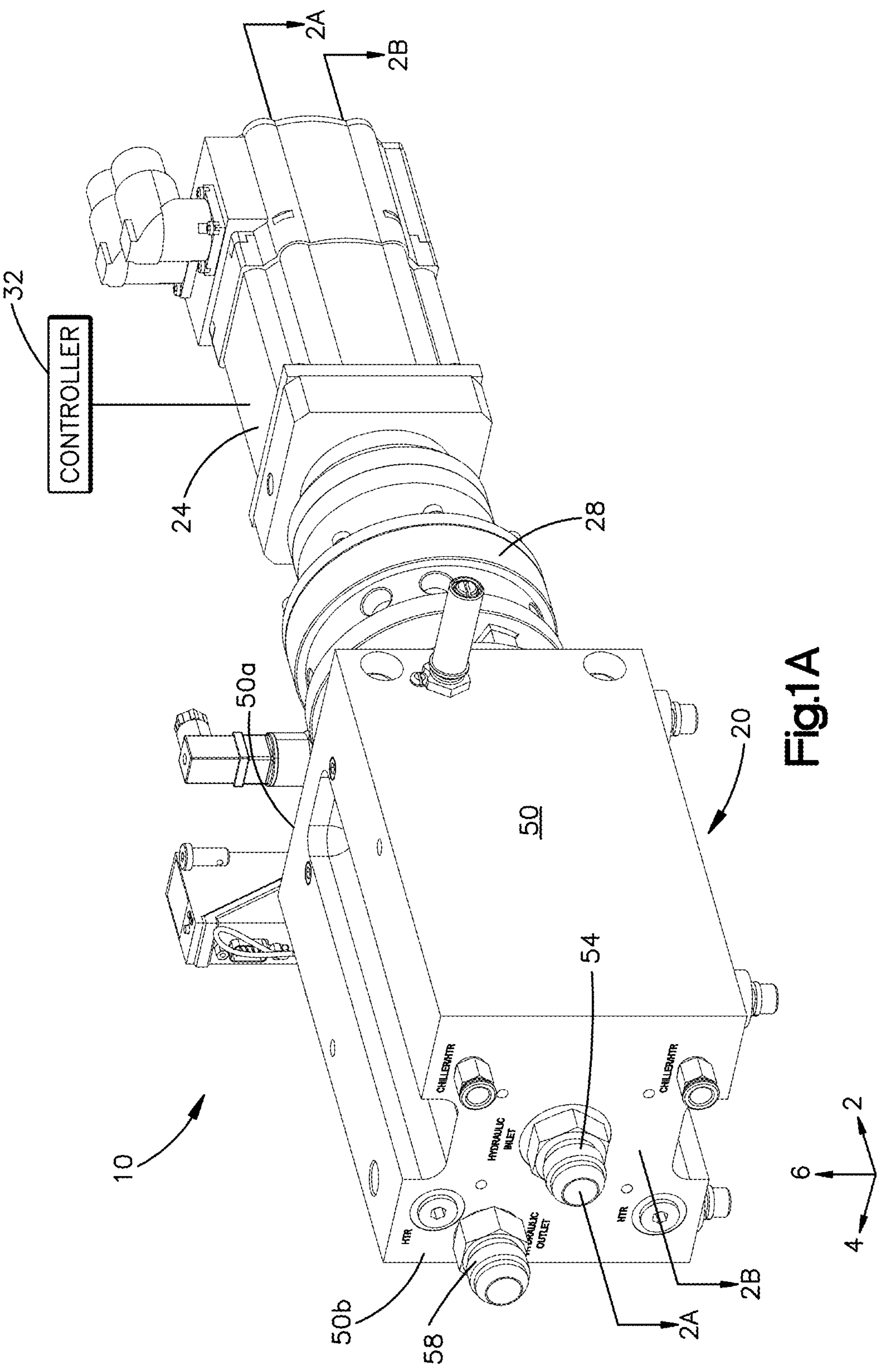
FIG. 1A illustrates a perspective view of a mixing system according to an embodiment of the present disclosure.
Figure 1B:
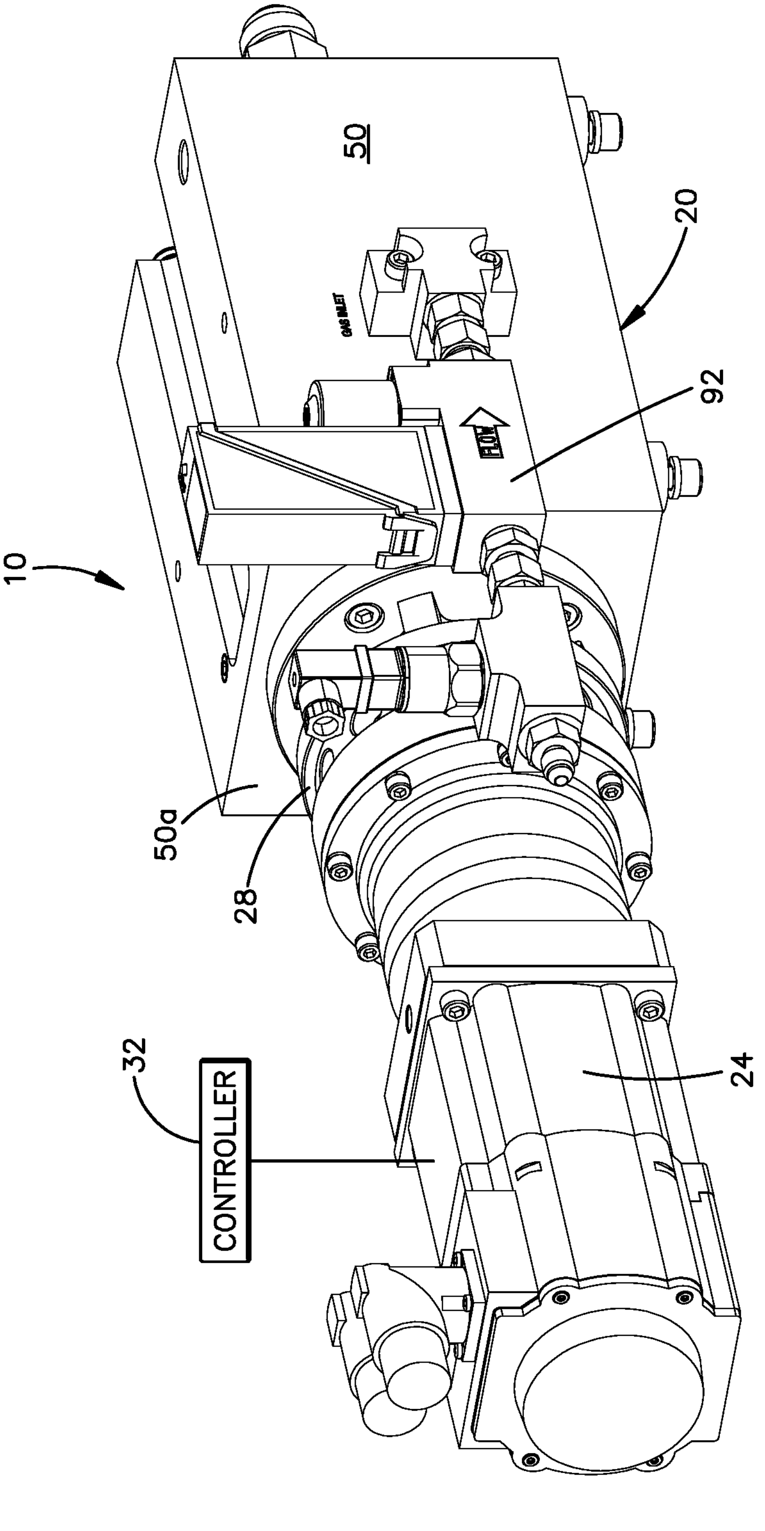
FIG. 1B illustrates another perspective view of the mixing system of FIG. 1A.

Described herein is a mixing system 10 that includes a mixing assembly 100 for mixing a solution comprising a liquid adhesive and a gas. Certain terminology is used to describe the mixing system 10 in the following description for convenience only and is not limiting. The words “right”, “left”, “lower,” and “upper” designate directions in the drawings to which reference is made. The words “inner” and “outer” refer to directions toward and away from, respectively, the geometric center of the description to describe the mixing system 10 and related parts thereof. The words "upstream" and "downstream" refer to directions along the flow of solution in relation to a particular component of the mixing system 10. The words "forward" and "rearward" refer to directions in a longitudinal direction 2 and a direction opposite the longitudinal direction 2 along the mixing system 10 and related parts thereof. The terminology includes the above-listed words, derivatives thereof and words of similar import.

Unless otherwise specified herein, the terms "longitudinal," "lateral," and "vertical" are used to describe the orthogonal directional components of various components of the mixing system 10, as designated by the longitudinal direction 2, lateral direction 4, and vertical direction 6. It should be appreciated that while the longitudinal and lateral directions 2, 4 are illustrated as extending along a horizontal plane, and the vertical direction 6 is illustrated as extending along a vertical plane, the planes that encompass the various directions may differ during use.

Referring to FIGS. 1A-3, a mixing system 10 configured to mix a solution comprising a liquid adhesive and a gas is shown. The mixing system 10 can be utilized in a wide variety of applications, and as a result the liquid adhesive can be Room-Temperature-Vulcanizing (RTV) silicones, thermoplastic rubber-based hot melts, thermoplastic hot melts, polyurethane (PUR) hot melts, hybrid sealants, etc., while the gas can be nitrogen, noble gases, carbon dioxide, etc. Any combination of these liquid adhesives and gasses can be mixed to form a solution that can form a foam on a substrate when dispensed from a foam dispenser.

The mixing system 10 can include a mixer 20 comprising a manifold 50 and a mixing assembly 100 configured to be received within the manifold 50, where the mixing assembly 100 will be described further below. The mixing system 10 can further include a motor 24 operably coupled to a rotor 134 of the mixing assembly 100. The motor 24 can be a DC motor, variable frequency AC motor, servo motor, stepper motor, etc. The mixing system 10 can also include a motor reducer 28 operably connected to the motor 24 and the rotor 134, where the motor reducer 28 is configured to reduce the rotational speed imparted on the rotor 134 while increasing the torque imparted on the rotor 134. The motor reducer 28 can produce a 10:1 reduction, though other reductions are contemplated.

The mixing system 10 can include a controller 32 in wired and/or wireless signal communication with the mixing system 10, and in particular the motor 24 and flow meter 70 of the mixing system 10. The controller 32 can be configured to control operation of the motor 24, and can comprise any suitable computing device configured to host a software application for monitoring and controlling various operations of the mixing system 10 as described herein. It will be understood that the controller 32 can include any appropriate computing device, examples of which include a processor, a desktop computing device, a server computing device, or a portable computing device, such as a laptop, tablet, or smart phone. Specifically, the controller 32 can include a memory and a human-machine interface (HMI) device. The memory can be volatile (such as some types of RAM), non-volatile (such as ROM, flash memory, etc.), or a combination thereof. The controller 32 can include additional storage (e.g., removable storage and/or non-removable storage) including, but not limited to, tape, flash memory, smart cards, CD-ROM, digital versatile disks (DVD) or other optical storage, magnetic tape, magnetic disk storage or other magnetic storage devices, universal serial bus (USB) compatible memory, or any other medium which can be used to store information and which can be accessed by the controller 32. The memory of the controller 32 can be configured to store and recall on demand various mixing operations and the requisite operation of the motor 24 required to achieve the corresponding mixing characteristics.

The HMI device can include inputs that provide the ability to control the controller 32, and thus the motor 24, via, for example, buttons, soft keys, a mouse, voice actuated controls, a touch screen, movement of the controller 32, visual cues (e.g., moving a hand in front of a camera on the controller 32), or the like. The HMI device can provide outputs via a graphical user interface, including visual information, such as the visual indication of the current conditions within the mixing system 10, as well as acceptable ranges for these parameters via a display. Other outputs can include audio information (e.g., via speaker), mechanically (e.g., via a vibrating mechanism), or a combination thereof. In various configurations, the HMI device can include a display, a touch screen, a keyboard, a mouse, a motion detector, a speaker, a microphone, a camera, or any combination thereof. The HMI device can further include any suitable device for inputting biometric information, such as, for example, fingerprint information, retinal information, voice information, and/or facial characteristic information, for instance, so as to require specific biometric information for accessing the controller 32.

Continuing with FIGS. 1A-3, the manifold 50 of the mixer 20 can extend from a first end 50*a* to a second end 50*b* opposite the first end 50*a* along the longitudinal direction 2. The manifold 50 can further define an input 54 at the second end 50*b* configured to receive the adhesive from an adhesive source (not shown). Though depicted as located at the second end 50*b*, the input 54 can be otherwise located on the manifold 50 as desired. The flow path of the adhesive through the mixing system 10 is represented by the bold arrows shown in FIGS. 2A and 2B. The manifold 50 can include a passage 62, which extends from the input 54 to a mixing chamber 82. The mixing system 10 can include a flow meter 70 that is configured to measure the flow rate of the adhesive flowing adjacent the input 54. In one example, the flow meter 70 can be disposed upstream of the input 54 as shown. In another example, the flow meter can be configured to measure the flow rate downstream of the input 54, such as along the passage 62 between the input 54 and the mixing chamber 82. The flow meter 70 can comprise a gear flow meter, though other types of flow meters can be used as desired. As shown schematically in FIG. 2A, the flow meter 70 can be in wired and/or wireless communication with the controller 32, such that the flow meter 70 can provide the controller 32 with a signal indicative of the measured flow rate of the adhesive.

The mixing chamber 82 is configured to receive the mixing assembly 100, as will be described further below. The mixing chamber 82 is thus in fluid communication with the input 54 and receives adhesive from the input 54, as well as gas from a gas input assembly 92, which will be described further below, to form a solution comprising the adhesive and the gas. The mixing chamber 82 can define a cavity extending into the manifold 50 from the first end 50*a*. The mixing chamber 82 can have a substantially circular cross section viewed along a plane defined by the lateral and vertical directions 4, 6 so as to form a complementary shape with components of the mixing assembly 100. As a result, the mixing chamber 82 can define other shapes to accommodate alternate embodiments of the mixing assembly 100. The mixer 20 can include a cap 86 configured to couple to the manifold 50 at the first end 50*a* such that the cap 86 bounds and at least partially defines the mixing chamber 82. The cap 86 can be coupled to the manifold 50 so as to create a fluid seal between the manifold 50 and the cap 86, thus preventing the solution from leaking from the mixing chamber 82. The cap 86 can be coupled to the manifold 50 through detachable fasteners, though other methods of attaching the cap 86 to the manifold 50 are contemplated, such as threaded engagement, clamps, etc. A passage 90 can extend longitudinally through the cap 86 such that a rod 150 can extend through the cap 86 from the motor reducer 28 to the rotor 134, as will be described further below. As shown in FIG. 2B, the manifold 50 can further include an output 58 in fluid communication with the mixing chamber 82 through an output passage 84 and configured to output the mixed solution from the manifold 50. A plurality of static mixers 250 can be disposed within the output passage 84 for statically mixing the solution, where the static mixers 250 will be described further below. Though depicted as located on the second end 50*b* of the manifold 50, it is contemplated that the output 58 can be located elsewhere on the manifold 50 as desired. The output 58 can be configured to output the solution to a dispenser configured to apply the solution as a foam to a substrate, such as parts requiring a foam gasket or pleat stabilization.

The mixing system 10 can further include a gas input assembly 92 configured to provide pressurized gas to the mixing chamber 82. The gas input assembly 92 can be configured to provide pressurized gas to the mixing chamber 82 from a pressurized gas source (not shown). The gas input assembly 92 can define a hose assembly or other assembly capable of directing a flow of pressurized gas, and can be in fluid communication with an gas input 96 defined by the manifold 50. In the depicted embodiment, the gas input 96 extends from the outer surface of the manifold 50 to the mixing chamber 82. An input valve 98 can be disposed within the gas input 96, where the input valve 98 can be configured to selectively obstruct the gas input 96. For example, in an open position, the input valve 98 can be configured to place the gas input assembly 92 in fluid communication with the mixing chamber 82, while in a closed position, the input valve 98 can be configured to prevent the mixing chamber 82 and gas input assembly 92 from being in fluid communication. In the depicted embodiment, the input valve 98 can be normally in a closed position so as to prevent solution from exiting the mixing chamber 82 through the gas input assembly 92. The input valve 98 can then open upon coming into contact with a pressurized gas flow of a sufficient flow rate, allowing the pressurized gas to flow into the mixing chamber 82. The pressurized gas source supplying the gas input assembly 92 can be manually actuated by an operator of the mixing system 10, or automatically by the controller 32.

In operation, the adhesive can be pumped through the input 54 from the adhesive source at a particular rate. The flow meter 70 can measure the flow rate of the adhesive and communicate the flow rate to the controller 32. Generally, the mixture produced by the mixing system 10 will comprise an amount of gas that necessarily relates to the amount of adhesive provided to the mixing chamber 82. As a result, in response to receiving the flow rate of the adhesive from the flow meter 70, the controller 32 can operate the pressurized gas source to provide an amount of gas to the mixing chamber 82 through the gas input assembly 92 that corresponds to the amount of adhesive provided to the mixing chamber from the adhesive source. The relative amounts of adhesive and gas that comprise the mixture can fluctuate depending upon factors such as the type of solution being created, the dispensing operation being performed, the type of adhesive and/or gas, etc. In other embodiments, the controller 32 can operate the pressurized gas source to provide an amount of gas to the mixing chamber 82, and then operate the adhesive source to provide a requisite amount of adhesive to the input 54.

Now referring to FIGS. 2A-3, the mixing assembly 100 will be described in greater detail. The mixing assembly 100 can include a rotor 134 operably coupled to the motor 24, such the motor 24 is configured to rotate the rotor 134. Specifically, the rotor 134 can define a first end 134*a*, a second end 134*b* opposite the first end 134*a* along the longitudinal direction 2, and an outer surface 135 that extends from the first end 134*a* to the second end 134*b*. The rotor 134 can have a cylindrical shape, and the outer surface 135 can be a curved outer surface that is curved about a longitudinal axis A that is parallel to the longitudinal direction 2. The rotor 134 can be configured to rotate within the mixing chamber 82 about the longitudinal axis A so as to mix the solution. The rotor 134 can define a passage 138 extending through the rotor 134 from the first end 134*a* to the second end 134*b* along the longitudinal direction 2. The passage 138 is configured to receive a rod 150, where the rod 150 extends from the rotor 134 to the motor reducer 28 so as to rotationally couple the rotor 134 to the motor reducer 28. Specifically, the rod 150 extends from a first end 150*a* at which the rod 150 connects to the motor reducer 28, to a second end 150*b* opposite the first end 150*a* along the longitudinal direction 2, where the rod 150 connects to a fastener 154, as will be described below. The passage 138 can have a substantially cylindrical shape that substantially corresponds to the outer profile of the rod 150. However, the passage 138 can define other shapes as desired to accommodate various other rod embodiments.

The rod 150 can comprise a solid, cylindrical rod configured to transfer torque from the motor reducer 28 to the rotor 134. The rod 150 can define at least one notch extending into the rod 150 from the outer surface, where the at least one notch is configured to receive a portion of a device that rotationally couples the rod 150 to the rotor 134. In the depicted embodiment, the rod 150 can define a first notch 140*a* and a second notch 140*b* spaced from the first notch 140*a* along the longitudinal direction 2. The rotor 134 can define a first channel 142*a* and a second channel 142*b* spaced from the first channel 142*a* along the longitudinal direction 2, where each of the first and second channels 142*a*, 142*b* extends from the outer surface 135 of the rotor 134 to the passage 138. Each of the first and second channels 142*a*, 142*b* is configured to receive a respective pin 162*a*, 162*b*. The first pin 162*a* is configured to be disposed within the first channel 142*a* and engage the first notch 140*a*, while the second pin 162*b* is configured to be disposed within the second channel 142*b* and engage the second notch 140*b* so as to rotatably couple the rotor 134 to the rod 150. Engagement between the first and second pins 162*a*, 162*b* and the rotor 134 and rod 150 functions to rotationally couple the rod 150 to the rotor 134. In the depicted embodiment, the first and second pins 162*a*, 162*b* can define an external threading configured to engage a corresponding threading within the first and second channels 142*a*, 142*b* to lock the first and second pins 162*a*, 162*b* within the first and second channels 142*a*, 142*b*. However, it is contemplated that other methods of securing the pins 162*a*, 162*b* can be utilized. Though the first and second notches 140*a*, 140*b* are depicted as located on the rod 150 at particular locations, they can be otherwise located on the rod 150 as desired. Likewise, though the first and second channels 142*a*, 142*b* are depicted as located on the rod 150 at particular locations, they can be otherwise located within the rotor 134 as desired. However, the positioning of the first and second notches 140*a*, 140*b* will generally match that of the first and second channels 142*a*, 142*b*.

Figure 3:
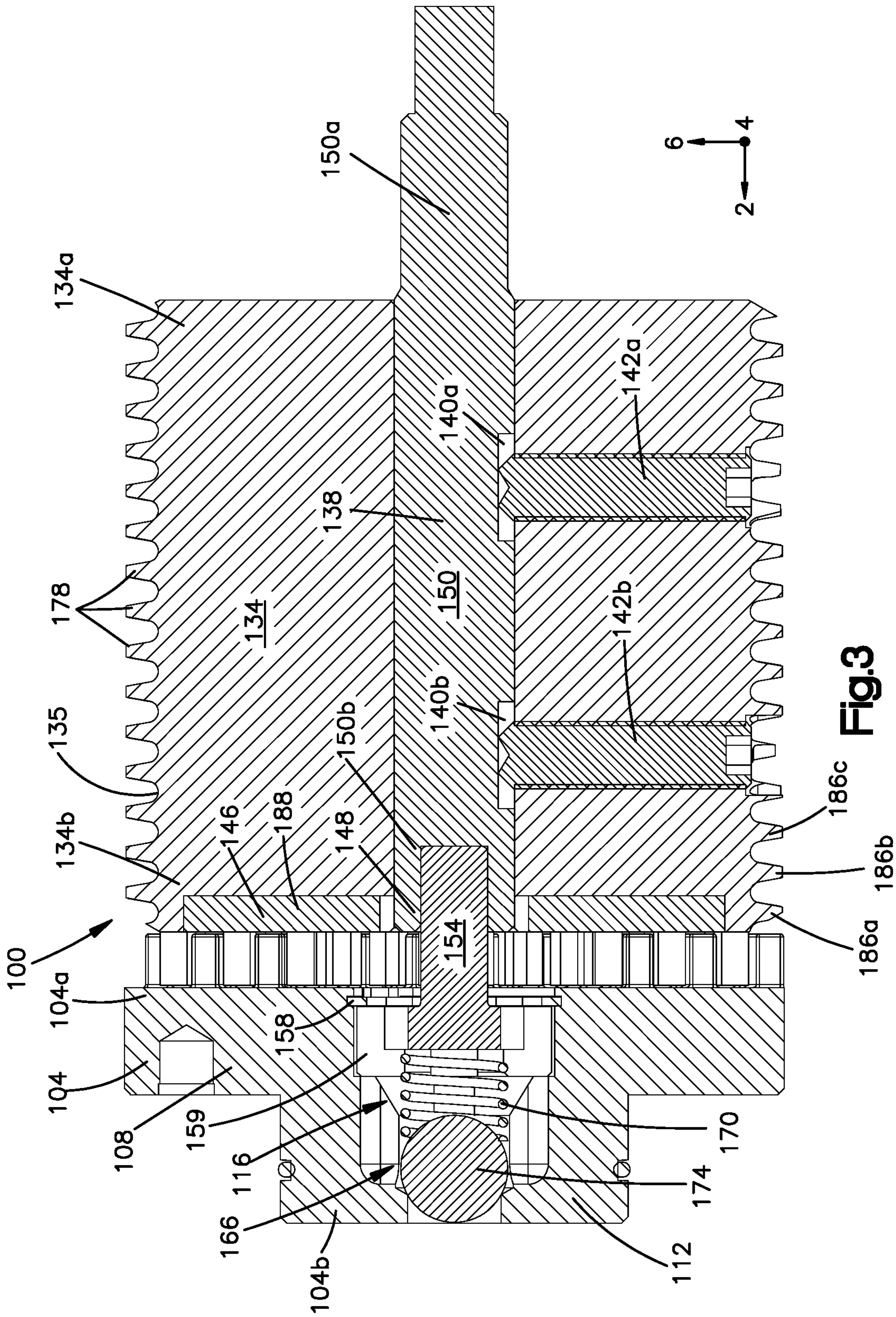
FIG. 3 illustrates a cross-sectional view of the mixing assembly of the mixing system shown in FIG. 1A, taken along line 2A-2A in FIG. 1A.
Figure 5:
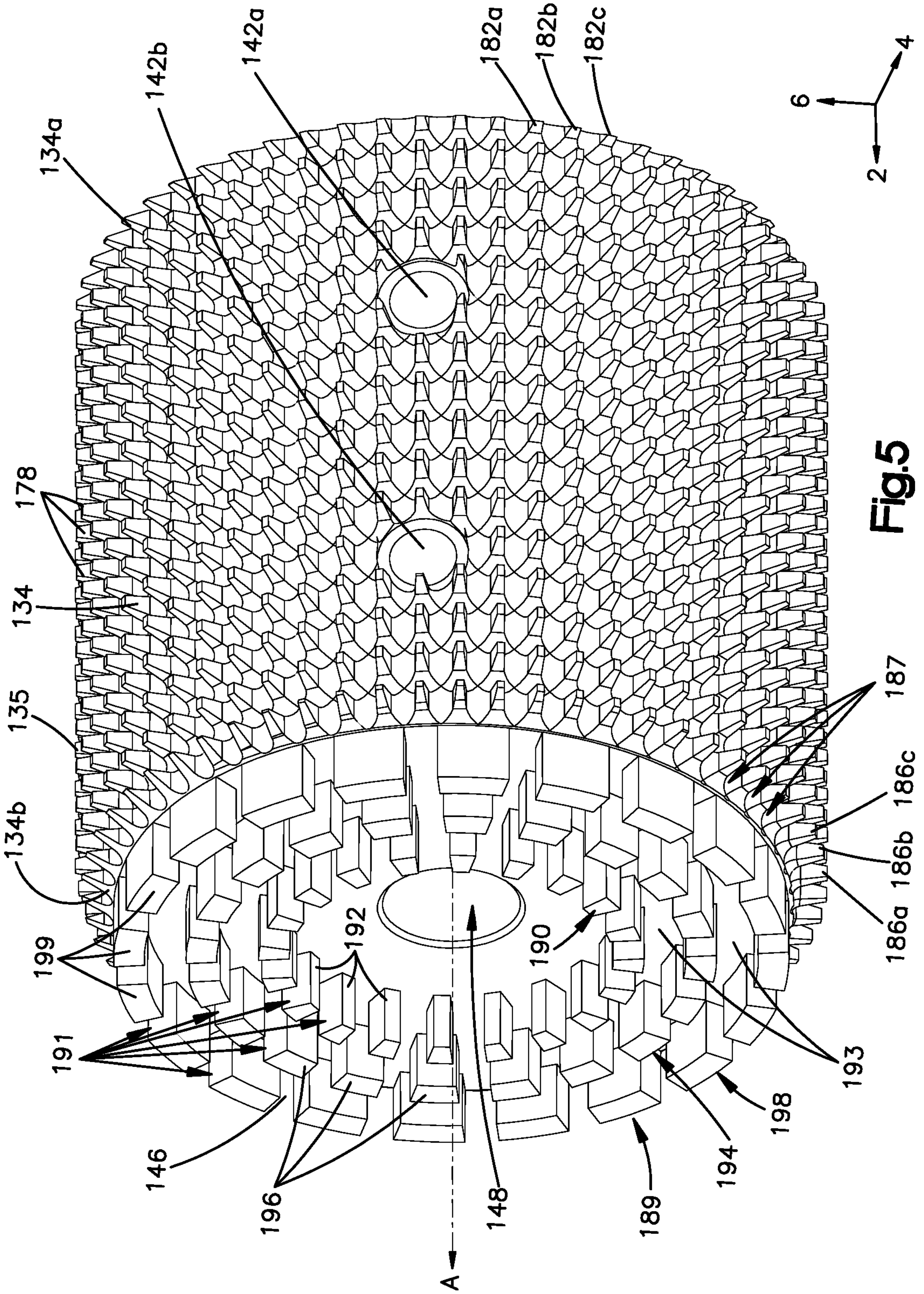
FIG. 5 illustrates a perspective view of a plate and rotor of the mixing assembly shown in FIG. 3.

Referring to FIGS. 3 and 5, the mixing assembly 100 can include a plate 146 attached to the second end 134*b* of the rotor 134. Specifically, the rotor 134 can define a recess 188 extending into the rotor 134 from the second end 134*b*, where the plate 146 is configured to be received by the recess 188. The plate 146 can be attached to the rotor 134 through fasteners (not shown), though other means of attaching the plate 146 to the rotor 134 are contemplated, such as welding, integral formation, etc. As a result, the plate 146 can be rotationally coupled to the rotor 134, such that the plate 146 rotates with the rotor 134 upon receiving torque from the motor 24 through the rod 150. A passage 148 can extend through the plate 146 along the longitudinal direction 2, where the passage 148 is substantially aligned with the passage 138 of the rotor 134 when the plate 146 is attached to the rotor 134. This allows the rod 150 to extend through the passage 138 of the rotor 134 and through the passage 148 of the plate 146.

The mixing assembly 100 can further include a stator 104 positioned within the mixing chamber 82. The stator 104 can extend from a first end 104*a* to a second end 104*b* opposite the first end 104*a* along the longitudinal direction 2. The first end 104*a* can include a main body 108 of the stator 104, where the main body 108 defines a cross-section having a diameter that substantially matches the diameter of the cross-section of the mixing chamber 82. In contrast, the second end 104*b* can include a protrusion 112 extending from the main body 108 along the longitudinal direction 2, where the protrusion 112 defines a cross-section having a smaller diameter than the main body 108. However, in other embodiments it is contemplated that the stator 104 can define a body having a diameter that is substantially constant from the first end 104*a* to the second end 104*b*.

The stator 104 can define a passage 116 that extends through the stator 104 from the first end 104*a* to the second end 104*b* along the longitudinal direction 2. The passage 116 can also extend through the stator 104 from the main body 108 to the protrusion 112. The passage 116 can be in fluid communication with the passage 62, such that the passage 116 is configured to receive the adhesive from the input 54 and provide the adhesive to the mixing chamber 82. The passage 116 can be configured to receive a portion of the fastener 154 attached to the second end 150*b* of the rod 150, as well as a locking ring 158 longitudinally attached to the stator 104 and configured to engage the fastener 154 so as to fix the fastener 154, and thus the rod 150, to the locking ring 158 and the stator 104 along the longitudinal direction 2. The engagement between the fastener 154 and the locking ring 158 prevents the rod 150 and the rotor 134 from longitudinally pulling away from the stator 104. The passage 116 can receive a plate 159 that defines a plurality of circumferentially-arranged bores 160 extending therethrough along the longitudinal direction 2. In operation, the adhesive flows through the bores 160 of the plate 159 as it flows through the passage 116. The plate 159 can be integral with a portion of the fastener 154, or can comprise a separate component configured to be disposed around the fastener 154. As depicted, the plate 159 can define four bores 160 equally spaced apart circumferentially. However, the plate 159 can define more or less than four bores 160. For example, the plate can define one, two, three, or more than four bores. Further, the bores may define non-equidistant spacing about the plate 159. The number and spacing of the bores 160 can be defined based upon the desired flow characteristics of the adhesive as it enters the mixing chamber 82.

The passage 116 can also be configured to receive a valve 166. The valve 166 can be a one-way valve configured to allow the adhesive to flow through the passage 116 from the passage 62 to the mixing chamber 82, but prevent the adhesive from flowing through the passage 116 from the mixing chamber 82 to the passage 62. The valve 166 can comprise a spring 170 and a ball 174, where the spring 170 is biased between the fastener 154 and the ball 174. In operation, as the adhesive flows through the passage 62, the force of the adhesive flow can press against the ball 174, causing the spring 170 to compress towards the fastener 154 along the longitudinal direction 2. This opens the passage 116, and thus places the passage 62 in fluid communication with the mixing chamber 82. In contrast, when no adhesive is flowing through the passage 62, the spring 170 biases the ball 174 against a portion of the protrusion 112 of the stator 104, thus blocking the passage 116 and causing the passage 62 to be out of fluid communication with the mixing chamber 82. As a result, the valve 166 prevents adhesive located within the mixing chamber 82 from flowing upstream out of the mixing chamber 82 and back into the passage 62. Though the valve 166 is specifically shown as comprising a spring 170 and a ball 174, it is contemplated that other types of valves can be utilized.

Unlike the rotor 134 and the plate 146, the stator 104 is rotationally coupled to the manifold 50. In other words, the stator 104 is configured to remain stationary during a mixing operation, while the motor 24 is configured to rotate the rotor 134 and the plate 146 within the mixing chamber 82 relative to the stator 104. To couple the stator 104 to the manifold 50, the manifold 50 can define an elongate bore 117*a* (labeled in FIG. 2A) that is open to the mixing chamber 82 and configured to align with an elongate bore 117*b* (labeled in FIGS. 2A, 4B) that extends into the main body 108 of the stator 104 when the stator 104 is received within the mixing chamber 82. A pin 118 can be disposed within the elongate bores 117*a*, 117*b*, where engagement between the pin 118 and the manifold 50 and the stator 104 is configured to rotationally couple the stator 104 to the manifold 50.

Figure 4B:
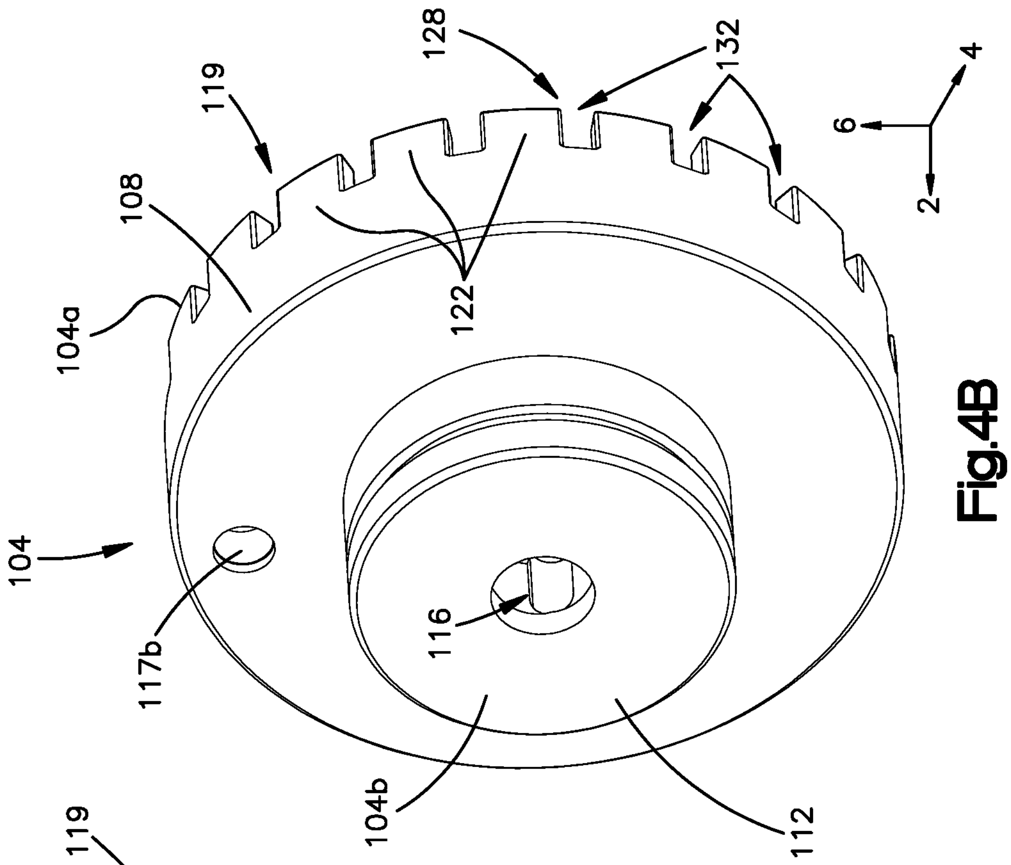
FIG. 4B illustrates an alternative perspective view of the stator shown in FIG. 4A.
Figure 4A:
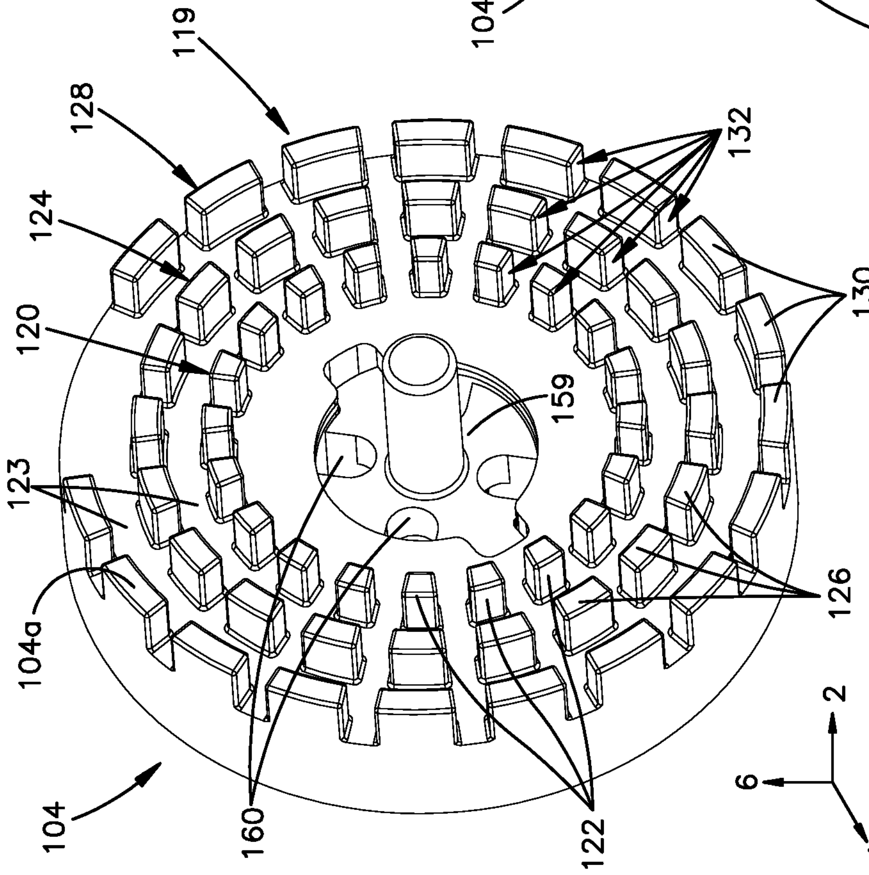
FIG. 4A illustrates a perspective view of a stator of the mixing assembly shown in FIG. 3.

Referring to FIGS. 4A and 4B, mixing the adhesive and gas to create the solution can in large part be accomplished by teeth defined by various components of the mixing assembly 100 that extend into the mixing chamber 82. For example, the stator 104 can define a plurality of teeth 119 extending from the stator 104 along the longitudinal direction 2. When disposed within the mixing chamber 82, the plurality of teeth 119 can extend along the longitudinal direction 2 away from the main body 108 of the stator 104 towards the rotor 134. As the stator 104 is rotationally static relative to the manifold 50, the plurality of teeth 119 can statically mix the adhesive and gas into the solution as the adhesive flows out of the passage 116 of the stator 104 through the bores 160 and the gas flows out of the gas input assembly 92 through gaps 132 defined between adjacent pairs of teeth 119.

The plurality of teeth 119 defined by the stator 104 can define a particular arrangement. For example, the stator 104 can define a first ring of teeth 120, a second ring of teeth 124, and a third ring of teeth 128, where each of the rings of teeth 120, 124, 128 defines a respective plurality of teeth extending from the stator 104 in a ring-like arrangement. For example, the first ring of teeth 120 can define an inner-most arrangement of teeth 122 that extend from the stator 104 along the longitudinal direction 2. The second ring of teeth 124 can define an arrangement of teeth 126 that extend from the stator 104 along the longitudinal direction 2 and are concentrically positioned radially outwards from the teeth 122 of the first ring of teeth 120. The third ring of teeth 128 can define an arrangement of teeth 130 that extend radially outwards from the stator 104 along the longitudinal direction 2 and are concentrically positioned radially outwards from the teeth 126 of the second ring of teeth 124. As a result, the second ring of teeth 124 can be concentrically positioned between the first ring of teeth 120 and the third ring of teeth 128. A channel 123 can be defined between adjacent ones of the rings of teeth. For example, a channel 123 can be disposed between the first and second rings to teeth 120 and 124, and a channel 123 can be disposed between the second and third rings of teeth 124 and 128. Each channel 123 can have a ring shape. Each channel 123 can be devoid of any teeth. In other embodiments, it is contemplated that the plurality of teeth 119 may define other arrangements, such as more or less than three rings of teeth or arrangements other than rings.

In the depicted embodiment, each of the first, second, and third rings of teeth 120, 124, 128 can define the same number of teeth 122, 126, 130, respectively. As such, the teeth 122, 126, 130 of the first, second, and third rings 120, 124, 128 can define different sizes. The teeth 122, 126, and 130 can each have a width along a circumferential direction. In the depicted embodiment, the teeth 122 of the first ring of teeth 120 can define the smallest width of the plurality of teeth 119, the teeth 130 of the third ring of teeth 128 can define the largest width of the plurality of teeth 119, and the teeth 126 of the second ring of teeth 124 can define widths that are greater than that of the teeth 122 but less than that of the teeth 130. However, it is contemplated that each of the first, second, and third rings of teeth 120, 124, 128 can define different relative sizes and numbers of teeth as desired. Further, in other embodiments the teeth 122 of the first ring of teeth 120 can define different widths and/or other dimensions relative to each other, the teeth 126 of the second ring of teeth 124 can define different widths and/or dimensions relative to each other, and the teeth 130 of the third ring of teeth 128 can define different widths and/or other dimensions relative to each other.

As shown in FIG. 4A, gaps 132 can be formed between adjacent ones of the plurality of teeth 119 so as to allow the solution to flow through the mixing chamber 82. For example, a gap 132 can be defined between adjacent teeth 122 of the first ring of teeth 120, a gap 132 can be defined between adjacent teeth 126 of the second ring of teeth 124, and a gap 132 can be defined between adjacent teeth 130 of the third ring of teeth 128. A respective gap 132 from each of the rings of teeth 120, 124, 128 can be radially aligned with each other, such that the solution has a plurality of unobstructed paths through the rings of teeth 120, 124, 128 as it exits the bores 160 of the plate 159. However, it is contemplated that in other embodiments the gaps 132 defined between the teeth 122, 126, 130 of the rings of teeth 120, 124, 128 can be at least partially offset or staggered, such that the solution encounters some greater level of obstruction due to the plurality of teeth 119 of the stator 104 alone as it flows from the bores 160 of the plate 159.

Now referring to FIGS. 3 and 5, the plate 146, like the stator 104, can define a plurality of teeth 189 extending from the plate 146 along the longitudinal direction 2. When disposed within the mixing chamber 82, the plurality of teeth 189 can extend along the longitudinal direction 2 away from the rotor 134 towards the stator 104. Accordingly, the plurality of teeth 189 extend along the longitudinal direction 2 in an opposing direction to the plurality of teeth 119 of the stator 104. At least some of the teeth 189 of the plate 146 can be disposed between teeth 119 of the stator 104. Similarly, at least some of the teeth 119 of the stator 104 can be positioned between teeth 189 of the plate 146. As the plate 146 is rotationally coupled to the rotor 134, the plurality of teeth 189 can actively mix the adhesive and the gas into the solution as the gas flows out of the passage 116 of the stator 104 through the bores 160 and the gas flows out of the gas input assembly 92 through gaps 191 defined between each adjacent two teeth 189. As the plate 146 rotates, at least some of the teeth 189 of the plate 146 can rotate between teeth of the stator 104.

The plurality of teeth 189 defined by the plate 146 can define a particular arrangement. For example, the plate 146 can define a first ring of teeth 190, a second ring of teeth 194, and a third ring of teeth 198, where each of the rings of teeth 190, 194, 198 defines a respective plurality of teeth extending from the plate 146 in a ring-like arrangement. For example, the first ring of teeth 190 can define an inner-most arrangement of teeth 192 that extend from the plate 146 along the longitudinal direction 2. The second ring of teeth 194 can define an arrangement of teeth 196 that extend from the plate 146 along the longitudinal direction 2 and are concentrically positioned radially outwards from the teeth 192 of the first ring of teeth 190. The third ring of teeth 198 can define an arrangement of teeth 199 that extend radially outwards from the plate 146 along the longitudinal direction 2 and are concentrically positioned radially outwards from the teeth 196 of the second ring of teeth 194. As a result, the second ring of teeth 194 can be concentrically positioned between the first ring of teeth 190 and the third ring of teeth 198. A channel 193 can be defined between adjacent ones of the rings of teeth. For example, a channel 193 can be disposed between the first and second rings to teeth 192 and 194, and a channel 193 can be disposed between the second and third rings of teeth 194 and 198. Each channel 123 can have a ring shape. Each channel 123 can be devoid of any teeth. In other embodiments, it is contemplated that the plurality of teeth 189 may define other arrangements, such as more or less than three rings of teeth or arrangements other than rings.

In the depicted embodiment, each of the first, second, and third rings of teeth 190, 194, 198 can define the same number of teeth 192, 196, 199, respectively. As such, the teeth 192, 196, 199 of the first, second, and third rings 190, 194, 198 can define different sizes. For example, the teeth 122, 126, and 130 can each have a width along a circumferential direction. In the depicted embodiment, the teeth 192 of the first ring of teeth 190 can define the smallest width of the plurality of teeth 189, the teeth 199 of the third ring of teeth 198 can define the largest width of the plurality of teeth 189, and the teeth 196 of the second ring of teeth 194 can define widths that are greater than that of the teeth 192 but less than that of the teeth 199. However, it is contemplated that each of the first, second, and third rings of teeth 190, 194, 198 can define different relative sizes and numbers of teeth as desired. Further, in other embodiments the teeth 192 of the first ring of teeth 190 can define different widths and/or other dimensions relative to each other, the teeth 196 of the second ring of teeth 194 can define different widths and/or dimensions relative to each other, and the teeth 199 of the third ring of teeth 198 can define different widths and/or other dimensions relative to each other.

As shown in FIG. 5, gaps 191 can be formed between adjacent ones of the plurality of teeth 189 so as to allow the solution to flow through the mixing chamber 82. For example, a gap 191 can be defined between adjacent teeth 192 of the first ring of teeth 190, a gap 191 can be defined between adjacent teeth 196 of the second ring of teeth 194, and a gap 191 can be defined between each adjacent teeth 199 of the third ring of teeth 198. A respective gap 191 from each of the rings of teeth 190, 194, 198 can be radially aligned with each other, such that the solution has a plurality of unobstructed paths through the rings of teeth 190, 194, 198 as it exits the bores 160 of the plate 159. However, it is contemplated that in other embodiments the gaps 191 defined between the teeth 192, 196, 199 of the rings of teeth 190, 194, 198 can be at least partially offset of staggered, such that the solution encounters some greater level of obstruction due to the plurality of teeth 189 of the plate 146 alone as it flows from the bores 160 of the plate 159.

Figure 2A:
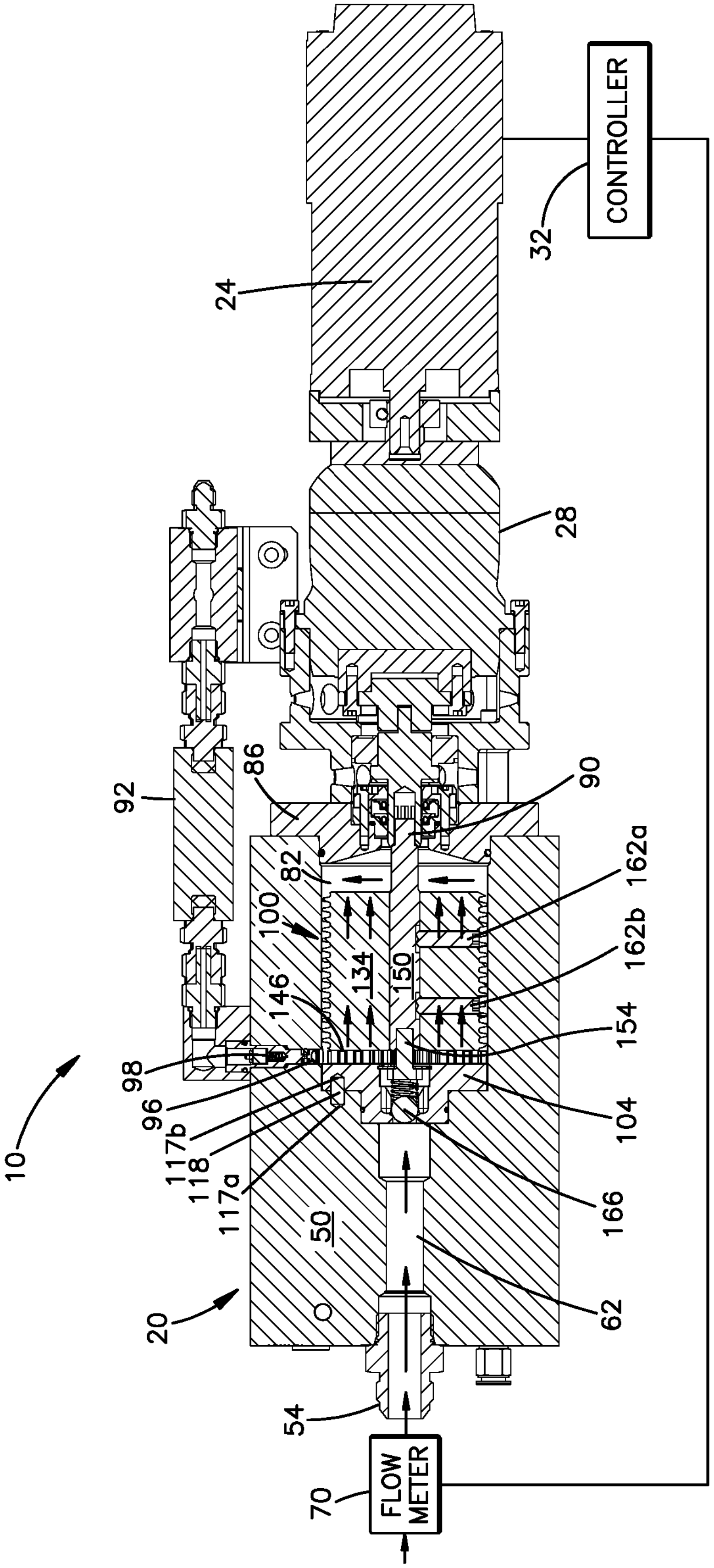
FIG. 2A illustrates a cross-sectional view of the mixing system shown in FIG. 1A, taken along line 2A-2A in FIG. 1A.
Figure 2B:
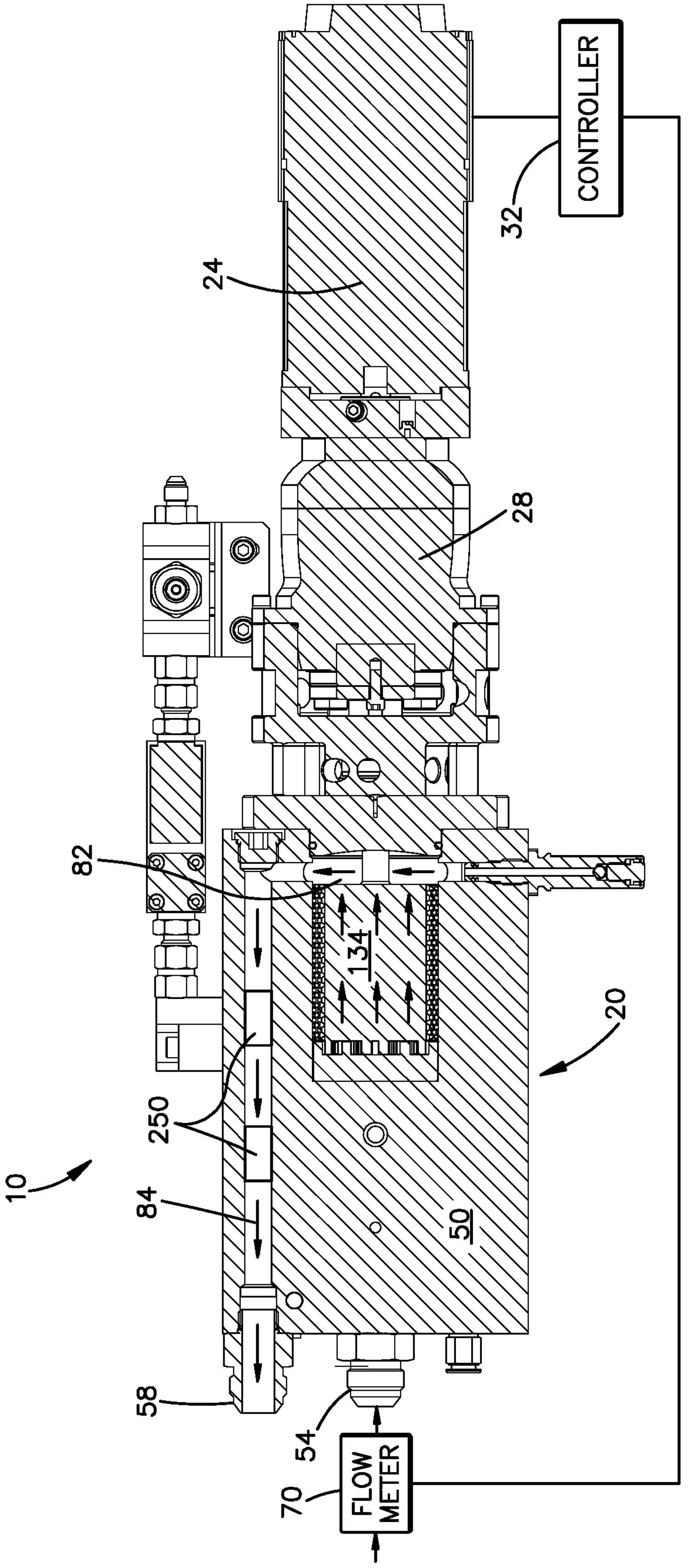
FIG. 2B. illustrates a cross-sectional view of the mixing system shown in FIG. 1A, taken along line 2B-2B in FIG. 1A.

When the mixing assembly 100 is disposed within the mixing chamber 82, the stator 104 and the plate 146 can be disposed adjacent to each other, such that adhesive and gas flowing into the mixing chamber 82 flows through the passage 116 of the stator 104, and then outwards along a plane defined by the lateral and vertical directions 4, 6 to the periphery of the mixing chamber 82, as shown in FIGS. 2A and 2B. As the solution flows between the stator 104 and the plate 146, the interaction between the plurality of teeth 119 of the stator 104 and the plurality of teeth 189 of the plate 146 can mix the solution. This can be amplified by the relative positioning between the plurality of teeth 119 and the plurality of teeth 189. As the plurality of teeth 119 extend away from the stator 104 towards the plate 146 while the plurality of teeth 189 extend away from the plate 146 towards the stator 104 when the mixing assembly 100 is arranged within the mixing chamber 82, the rings of teeth 120, 124, 128 of the stator 104 can be positioned such that they are substantially aligned with the rings of teeth 190, 194, 198 of the plate 146 in a plane defined by the lateral and vertical directions 4, 6, i.e., the plane along which fluid flows between the stator 104 and the plate 146. Thus, the teeth of the stator 104 and the teeth of the plate 146 can be aligned in a plane that is perpendicular to the longitudinal axis A such that the plane intersects the teeth of the stator 104 and the teeth of the plate 146.

Each channel 193 of the plate 146 can receive a corresponding ring of teeth of the stator 104. Similarly, each channel 123 of the stator 104 can receive a corresponding ring of teeth of the plate 146. For example, the first ring of teeth 120 of the stator 104 can be positioned in the channel 193 between the first and second rings of teeth 190 and 194 of the plate 146. The second ring of teeth 194 of the plate 146 can be positioned in the channel 123 between the first and second rings of teeth 120 and 124 of the stator 104. The second ring of teeth 124 of the stator 104 can be positioned in the channel 193 between the second and third rings of teeth 194 and 198 of the plate 146. The third ring of teeth 198 of the plate 146 can be positioned in the channel 123 between the second and third rings of teeth 124 and 148 of the stator 104.

Thus, the first ring of teeth 190 of the plate 146 can be positioned inwards from the first ring of teeth 120 of the stator 104 with respect to a radial direction. The first ring of teeth 120 of the stator 104 can be positioned inwards from the second ring of teeth 194 of the plate 146 with respect to the radial direction and outwards from the first ring of teeth 190 of the plate 146 with respect to the radial direction. The second ring of teeth 194 of the plate 146 can be positioned inwards from the second ring of teeth 124 of the stator 104 with respect to the radial direction and outwards from the first ring of teeth 120 of the stator 104 with respect to the radial direction. The second ring of teeth 124 of the stator 104 can be positioned inwards from the third ring of teeth 198 of the plate 146 with respect to the radial direction and outwards from the second ring of teeth 194 of the plate 146 with respect to the radial direction. The third ring of teeth 198 of the plate 146 can be positioned inwards from the third ring of teeth 128 of the stator 104 with respect to the radial direction and outwards from the second ring of teeth 124 of the stator 104 with respect to the radial direction. The third ring of teeth 128 of the stator 104 can be positioned outwards from each of the rings of teeth 190, 194, 198 of the plate 146 with respect to the radial direction. As the stator 104 is rotationally coupled to the manifold 50 while the plate 146 is rotationally coupled to the rotor 134, in operation the plurality of teeth 189 of the plate 146 are configured to rotate while the plurality of teeth 119 of the stator 104 remain static. This mix of both active and static mixing can aid in mixing the solution as the solution flows between the stator 104 and the plate 146 to the periphery of the mixing chamber 82.

Figure 6B:
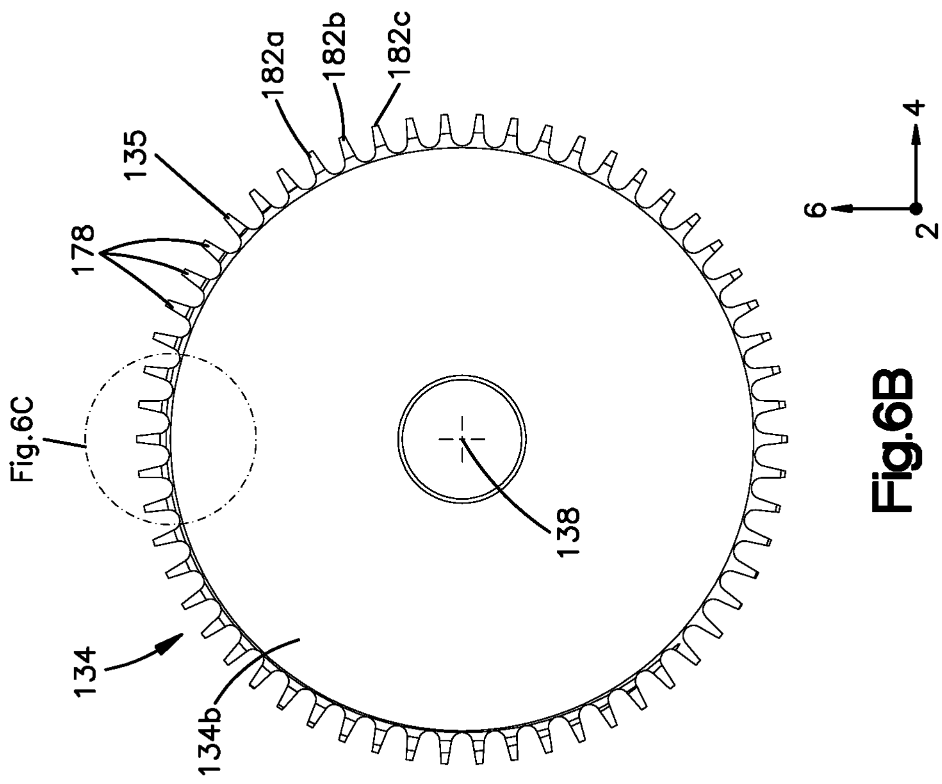
FIG. 6B illustrates a front view of the rotor shown in FIG. 3.
Figure 6A:
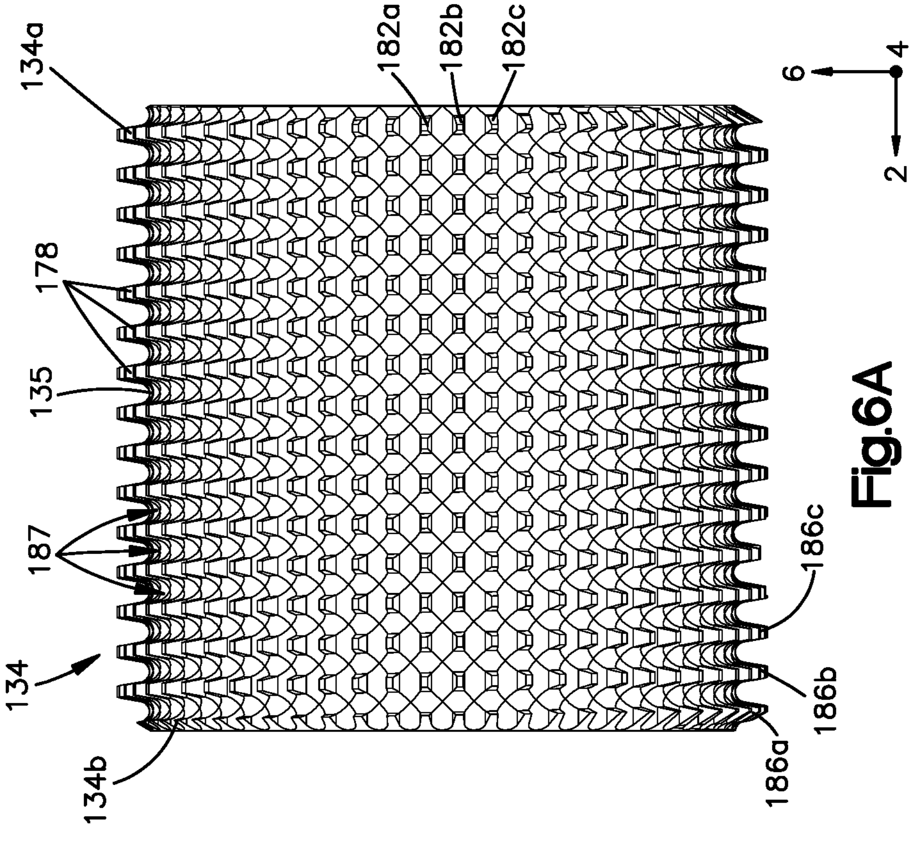
FIG. 6A illustrates a side view of the rotor shown in FIG. 3.
Figure 6C:
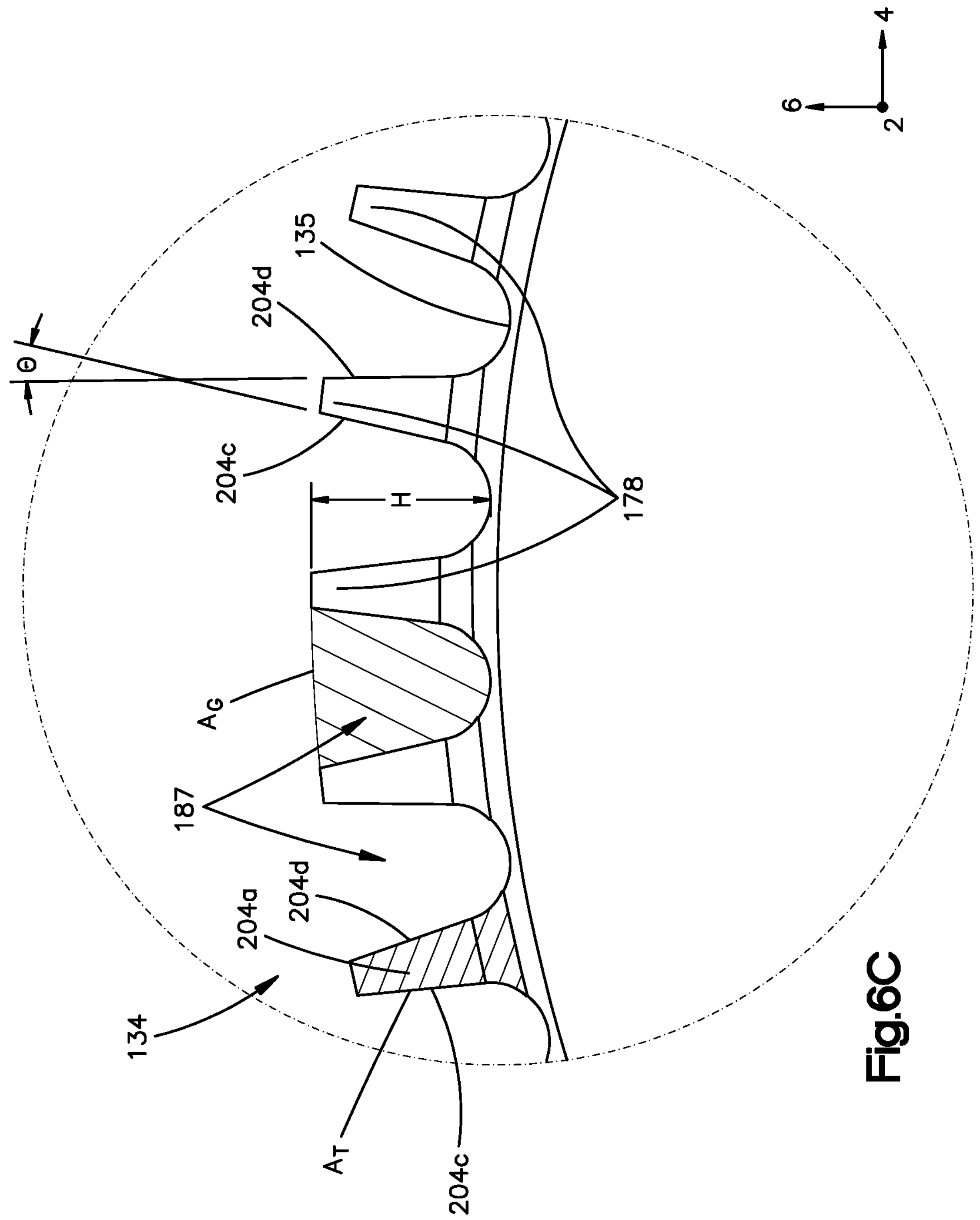
FIG. 6C illustrates an enlarged portion of the front view of the rotor shown in FIG. 6B.
Figure 7:
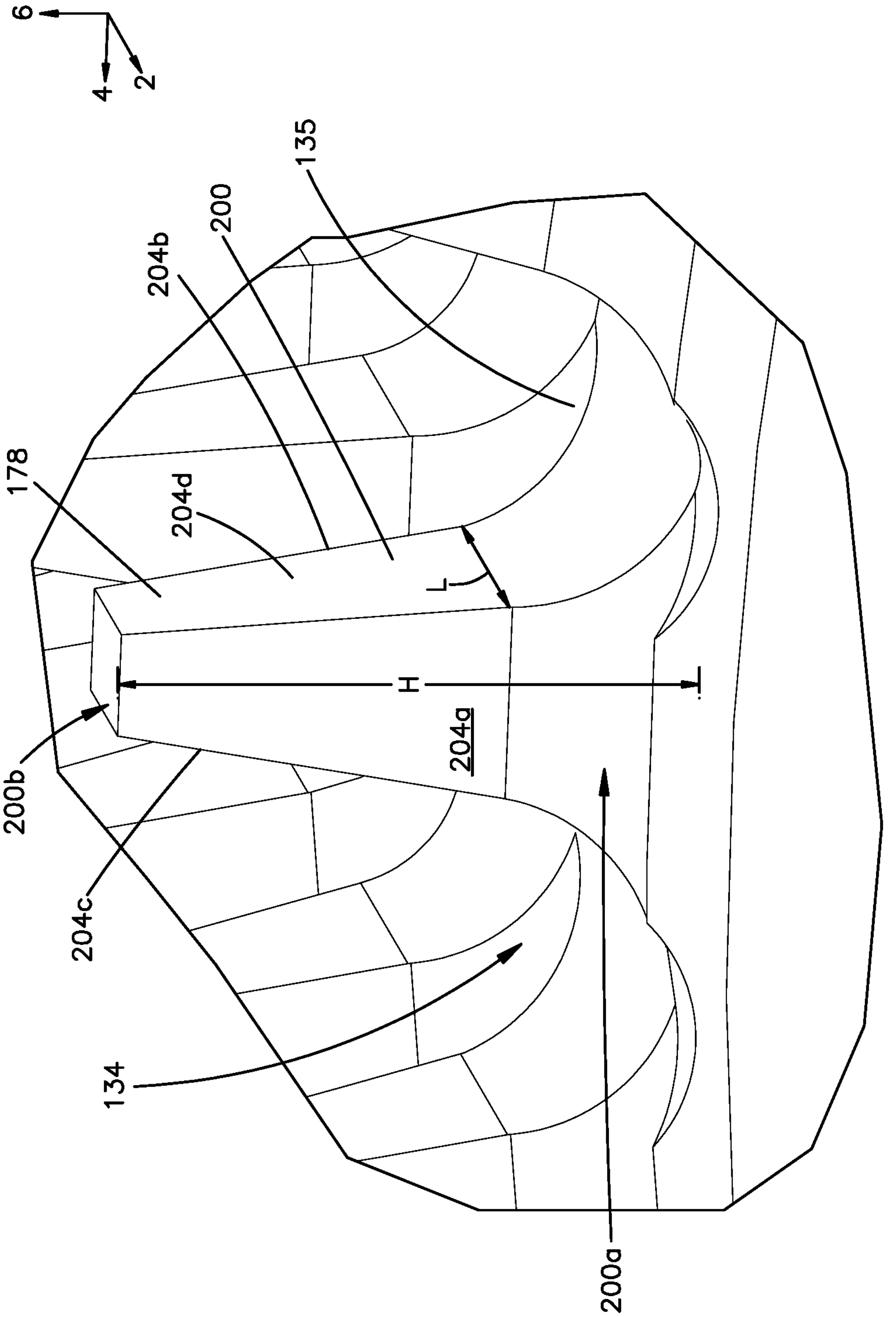
FIG. 7 illustrates a perspective view of a tooth of the rotor shown in FIG. 3.

Like the stator 104 and the plate 146, the rotor 134 can define a plurality of teeth 178 configured to aid in mixing the solution. Now referring to FIGS. 6-8, the plurality of teeth 178 can extend radially outwards from the outer surface 135 of the rotor 134. As a result, unlike the teeth 119, 189 of the stator 104 and plate 146, respectively, the plurality of teeth 178 of the rotor 134 extend from the outer surface 135 along the plane defined by the lateral and vertical directions 4, 6. The plurality of teeth 178 can be arranged along the outer surface 135 of the rotor 134 in a formation of columns and rows, where each column can extend substantially along the longitudinal direction 2, while each row can extend circumferentially about the outer surface 135 of the rotor along the plane defined by the lateral and vertical directions 4, 6. However, the columns and rows of the plurality of teeth can be alternatively oriented relative to the longitudinal, lateral, and vertical directions 2, 4, 6 as desired. Each two adjacent teeth 178 in each row of teeth 178 can define a gap 187 therebetween, where the solution is configured to flow through each gap 187 along the length of the rotor 134.

As depicted, the rotor 134 can include a first column 182*a* of teeth 178, a second column 182*b* of teeth 178, a third column 182*c* of teeth 178, . . . up to an $n^{th}$ column of teeth 178. In one embodiment, the rotor 134 can define between 60 and 130 columns of teeth 178. In another embodiment, the rotor 134 can define between 70 and 120 columns of teeth 178. Further, the rotor 134 can define between 80 and 110 columns of teeth 178. The rotor 134 can also define between 90 and 100 columns of teeth 178.

Additionally as depicted the rotor 134 can include a first row 186*a* of teeth 178, a second row 186*b* of teeth 178, a third row 186*c* of teeth 178, . . . up to an $n^{th}$ row of teeth 178. In one embodiment, the rotor 134 can define between 10 and 50 rows of teeth 178. In another embodiment, the rotor 134 can define between 15 and 45 rows of teeth 178. Further, the rotor 134 can define between 20 and 40 rows of teeth 178. The rotor 134 can also define between 25 and 35 rows of teeth 178.

In the depicted embodiment, the rotor 134 can include 58 columns of teeth 178 and 15 rows of teeth 178. As a result, the rotor 134 depicted can include 870 teeth 178. However, it is contemplated that in other embodiments, the rotor 134 can include less than 870 teeth 178. For example, the rotor 134 can include at least 400 teeth 178. Additionally, the rotor 134 can include at least 500 teeth 178. Further, the rotor 134 can include at least 600 teeth. The rotor 134 can also include at least 700 teeth 178. In other embodiments, the rotor 134 can include at least 800 teeth 178.

It is also contemplated that in other embodiments, the rotor 134 can include more than 870 teeth 178. For example, the rotor 134 can include at least 1,000 teeth 178. Additionally, the rotor 134 can include at least 1,500 teeth 178. Further, the rotor 134 can include at least 2,000 teeth. The rotor 134 can also include at least 2,500 teeth 178. In other embodiments, the rotor 134 can include at least 3,000 teeth 178. In one specific example, the rotor 134 can include 96 columns of teeth 178 and 30 rows of teeth 178. As a result, the rotor can include 2,880 teeth 178. The number of teeth 178 extending from the rotor 134 represents a greater number of teeth than included in rotors of conventional mixing assemblies. This creates more parallel paths for the solution to travel between the teeth 178, thus lowering the pressure drop of the solution as it flows through the mixing chamber 82. Further, the number of teeth 178 allows the diameter of the rotor 134 to be larger than conventional rotors, thus lowering the rotational speed at which the rotor 134 must be rotated in order to achieve adequate mixing. The speed at which the rotor 134 rotates to achieve adequate mixing of the solution will be described further below.

The ability to include an increased number of teeth 178 extending from the rotor can be driven by the decreased size of each individual ones of the teeth 178. Continuing with FIGS. 6-8, the structure of each of the teeth 178 will be described. Each one of the teeth 178 can define a body 200 that extends from a base 200*a* at the outer surface 135 to a tip 200*b* opposite the base 200*a*. The body 200 can define a height H measured from the base 200*a* to the tip 200*b*. In one embodiment, the height H is less than or equal 0.20 inches, such as less than or equal to 0.19 inches, such as less than or equal to 0.18 inches, such as less than or equal to 0.17 inches, such as less than or equal to 0.16 inches, such as less than or equal to 0.15 inches, such as less than or equal to 0.14 inches, such as less than or equal to 0.13 inches, such as less than or equal to 0.12 inches, such as less than or equal to 0.11 inches, such as less than or equal 0.10 inches, such as less than or equal to 0.9 inches, such as less than or equal to 0.8 inches, such as less than or equal to 0.7 inches. This relatively shorter height H of the body 200 of each of the teeth 178 aids in allowing more teeth 178 to extend from the outer surface 135 of the rotor 134, thus allowing the rotor 134 to have a greater diameter.

The body 200 of each of the teeth 178 can substantially define a trapezoidal prism. However, it is contemplated that the body could define other shapes, such as a cone, pyramid, rectangular prism, etc. The body 200 can define a front surface 204*a*, a rear surface 204*b* opposite the front surface 204*a* along the longitudinal direction 2, a first side surface 204*c*, and a second side surface 204*d* opposite the first side surface 204*c* along a circumferential direction. The first and second side surfaces 204*c*, 204*d* can by offset from each other by an angle Θ. In one embodiment, the angle Θ can be between 10 degrees and 50 degrees. The angle Θ can also be between 10 degrees and 45 degrees. Further, the angle Θ can be between 10 degrees and 40 degrees. Additionally, the angle Θ can be between 10 degrees and 35 degrees. Further, the angle Θ can be between 10 degrees and 30 degrees. Additionally, the angle Θ can be between 10 degrees and 35 degrees. In one specific example, the angle Θ can be 20 degrees. In another specific example, the angle Θ can be 30 degrees.

In addition to including more teeth 178 than in conventional mixing assemblies, the teeth 178 can define smaller cross-sectional profiles than other conventional mixing teeth. As a result, the rotor 134 can maximize the ratio of the surface area $A_T$ of the front surface 204*a* of the teeth 178 to the cross-sectional area $A_G$ of each gap 187. The surface area $A_T$ and the cross-sectional area $A_G$ can both me measured within a plane defined by the lateral and vertical directions 4, 6. Specifically, the cross-sectional area $A_G$ of each gap 187 can be measured from one tooth 178 to the adjacent tooth 178, and from the base 200*a* of each tooth 178 to the tip 200*b* of each tooth 178. The surface area $A_T$ of the front surface 204*a* of the teeth 178 can be less than 0.010 square inches, such as less than 0.0095 square inches, such as less than 0.0090 square inches, such as less than 0.0085 square inches, such as less than 0.0080 square inches, such as less than 0.0075 square inches, such as less than 0.0070 square inches, such as less than 0.0065 square inches, such as less than 0.0060 square inches, such as less than 0.0055 square inches, such as less than 0.0050 square inches, such as less than 0.0045 square inches, such as less than 0.0040 square inches, such as less than 0.0035 square inches, such as less than 0.0030 square inches, such as less than 0.0025 square inches. The cross-sectional area $A_G$ of each gap 187 can be greater than 0.0035 square inches, such as greater than 0.004 square inches, such as greater than 0.005 square inches, such as greater than 0.0060 square inches, such as greater than 0.0070 square inches, such as greater than 0.0080 square inches, such as greater than 0.0090 square inches, such as greater than 0.0100 square inches, such as greater than 0.011 square inches, such as greater than 0.012 square inches, such as greater than 0.013 square inches, such as greater than 0.014 square inches, such as greater than 0.015 square inches, such as greater than 0.016 square inches. The ratio of the surface area $A_T$ of the front surface 204*a* to the cross-sectional area $A_G$ of the gap 187 can be less than 0.60, such as less than 0.55, such as less than 0.50, such as less than 0.45.

In operation, as shown in FIGS. 2A and 2B, the adhesive can enter the mixing system 10 through the flow meter 70, flow through the input 54, and flow through the passage 62 to the passage 116 of the stator 104. Alternatively, the adhesive can enter the mixing system 10 through the input 54 and flow through the passage 62, flow through a flow meter 70 disposed along the passage 62, and flow to the passage 116 of the stator 104. When pumped at a sufficient flow rate, the solution can actuate the valve 166 so as to open the passage 116 and allow the solution to flow through the passage 116, through the bores 160 of the plate 159, and into the mixing chamber 82. Likewise, the gas can flow through the gas input assembly 92 and into the mixing chamber 82. Once in the mixing chamber 82, the solution comprising the adhesive and gas flows along a plane defined by the lateral and vertical directions 4, 6 outwards between the stator 104 and the plate 146. As stated previously, the motor 24 is configured to rotate the rotor 134 and plate 146 within the mixing chamber 82 about a longitudinal axis A. As a result, when flowing between the stator 104 and plate 146, the solution is mixed by the interaction of static teeth 119 of the stator 104, as the stator 104 is stationary relative to the manifold 50, and the moving teeth 189 of the plate 146, as the plate 146 is rotationally fixed to the rotor 134. After flowing past the stator 104 and plate 146, the solution flows along the longitudinal direction 2 along the outer surface 135 of the rotor 134 between the teeth 178, specifically between the gaps 187 defined between adjacent teeth 178. The motor 24 is configured to rotate the rotor 134 at a rotational speed as controlled by the controller 32 so as to effectively mix the solution into a homogenous solution devoid of gas bubbles. After flowing the length of the mixing chamber 82 around the rotor 134, the solution flows through the output passage 84 and the static mixers 250 positioned in the output passage 84, which will be discussed below, and to the output 58, where the solution flows to a dispenser.

As described above, the design of the rotor 134, and specifically the teeth 178 of the rotor 134, maximizes the number of teeth 178 extending from the rotor 134 and minimizes the ratio between the surface area $A_T$ of the front surface 204*a* of the teeth 178 to the cross-sectional area $A_G$ of the gaps 187 defined between two adjacent teeth 178. The design of the teeth 178 also allows the diameter of the rotor 134 to be increased, thus allowing the motor 24 to rotate the rotor 134 at lower rotational speeds and still achieve a high shear rate of the solution. For example, the motor 24 can be configured to rotate the rotor 134 at less than 100 revolutions per minute (RPM) such that the rotor 134 mixes the solution at a shear rate of greater than 100 reciprocal seconds. In one embodiment, the motor 24 can be configured to rotate the rotor 134 at less than 75 RPM such that the rotor 134 mixes the solution at a shear rate of greater than 100 reciprocal seconds. Additionally, the motor 24 can be configured to rotate the rotor 134 at less than 100 RPM such that the rotor 134 mixes the solution at a shear rate of greater than 120 reciprocal seconds. The motor 24 can also be configured to rotate the rotor 134 at less than 50 RPM to achieve any of the shear rates described above. The motor 24 can also be configured to rotate the rotor 134 at 10 RPM or less to achieve any of the shear rates described above. Further, the motor 24 can be configured to rotate the rotor 134 at less than any of the rotational speeds described above to achieve a shear rate in the solution greater than 140 reciprocal seconds. Shear rate is the velocity gradient measured across the diameter of a fluid-flow channel, or the rate of change of velocity at which one layer of fluid passes over an adjacent layer. The shear rates described above are estimated shear rates ignoring the teeth 178. Accordingly, these share rates are the average shear rate between the outer surface 135 of the rotor 134 and the stationary components of the mixing system 10, such as the manifold 50. As these shear rates are only estimates, errors due to the selection of dimensions for various components of the mixing system 10 are negligible.

Figure 9:
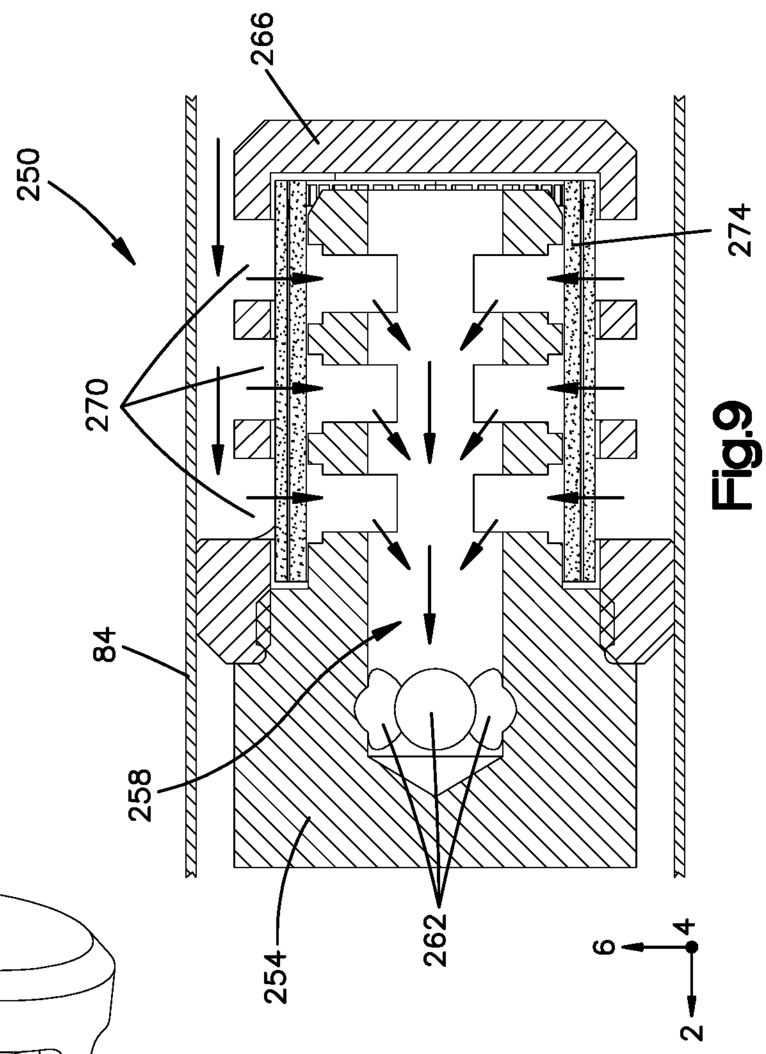
FIG. 9 illustrates a cross-sectional view of the static mixer shown in FIG. 8, taken along line 9-9 in FIG. 8.
Figure 8:
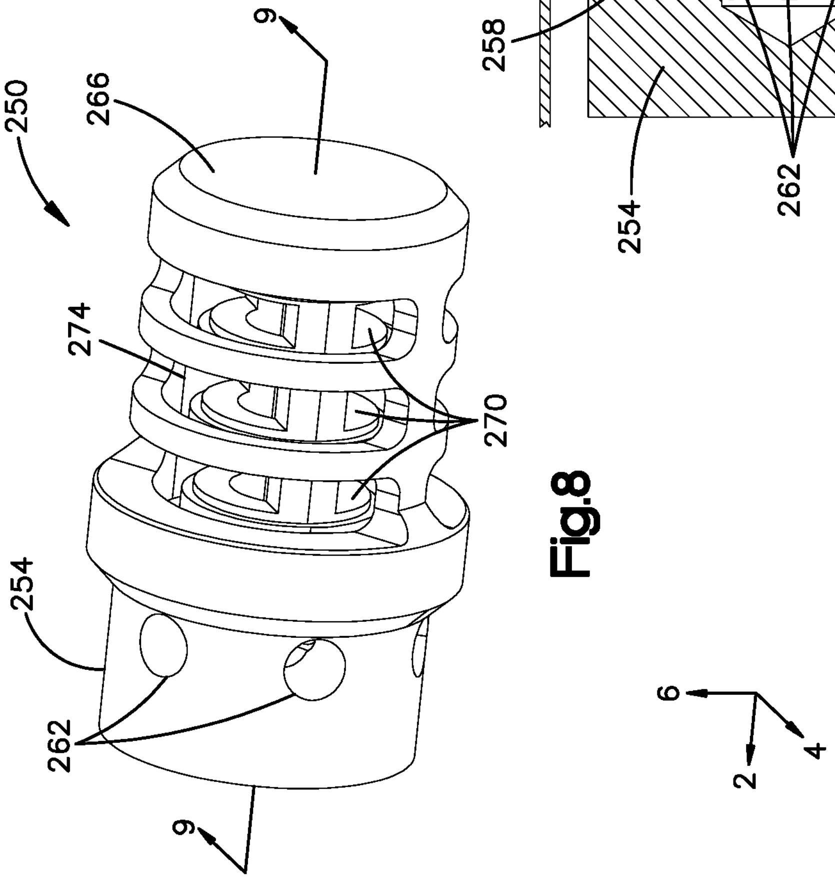
FIG. 8 illustrates a perspective view of the static mixer of the mixing system shown in FIG. 2B.

As stated above, with reference to FIGS. 2B, 8, and 9, a plurality of static mixers 250 can be disposed within the output passage 84 for statically mixing the solution flowing through the output passage 84. In the depicted embodiment, two static mixers 250 are disposed within the output passage 84 in series, such that the solution must flow through each static mixer 250 in sequence after flowing through the mixing chamber 82 and before reaching the output 58. However, more or less than two static mixers 250 can be positioned within the output passage 84 in other embodiments. Though the components of one static mixer 250 will be described, its components may be representative of each static mixer included in the mixing system 10. The static mixer 250 can include a base 254 that defines a passage 258 extending therethrough along the longitudinal direction 2, as well as a plurality of outlets 262 extending from the passage 258 to the outer surface of the base 254. The base 254 can define the portion of the static mixer 250 that engages the manifold 50 so as to secure the static mixer 250 within the output passage 84. A cap 266 can be disposed over a portion of the base 254, and can be secured to the base 254 through threaded engagement, snap-fit, slot and groove engagement, etc. The cap 266 can define a plurality of inputs 270 extending through the body of the cap 266 so as to receive a flow of the solution therethrough. A cylindrical screen 274 can be positioned between the cap 266 and the base 254, such that the cap 266 secures the screen 274 within the static mixer 250. In operation, when the static mixer 250 is positioned within the output passage 84, the static mixer 250, and particularly the screen 274, can be configured to break up large gas bubbles that still exist in the solution after passing through the mixing chamber 82. The screen 274 can comprise a mesh cylinder defining a plurality of small holes extending therethrough, such that large gas bubbles are broken up as the solution flows through the screen 274. As shown by the arrows in FIG. 9, the solution can flow through the inputs 270 of the cap 266 from the output passage 84, through the screen 274, into the passage 258, and out the outlets 262 of the base 254 back into the output passage 84.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts, and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features, and concepts may be expressly identified herein as being inventive or forming part of an invention, such identification is not intended to be exclusive, but rather there may be inventive aspects, concepts, and features that are fully described herein without being expressly identified as such or as part of a specific invention, the scope of the inventions instead being set forth in the appended claims or the claims of related or continuing applications. Descriptions of exemplary methods or processes are not limited to inclusion of all steps as being required in all cases, nor is the order that the steps are presented to be construed as required or necessary unless expressly so stated. While the invention is described herein using a limited number of embodiments, these specific embodiments are not intended to limit the scope of the invention as otherwise described and claimed herein. The precise arrangement of various elements and order of the steps of articles and methods described herein are not to be considered limiting.

What is claimed is:

1. A mixing system configured to mix a solution comprising a liquid adhesive and a gas, the mixing system comprising:

a manifold configured to receive the solution, a mixing chamber in fluid communication disposed in the manifold, and an output in fluid communication with the mixing chamber and configured to output the solution;

a rotor configured to rotate within the mixing chamber so as to mix the solution, wherein the rotor and the manifold are configured such that a shear rate between the rotor and the manifold is greater than 100 reciprocal seconds when the rotor rotates at less than 100 revolutions per minute (RPM); and a motor configured to rotate the rotor at less than 100 RPM such that the rotor mixes the solution at the shear rate of greater than 100 reciprocal seconds.

2. The mixing system of claim 1, wherein the motor is configured to rotate the rotor at less than 75 RPM such that the rotor mixes the solution at a shear rate of greater than 100 reciprocal seconds.

3. The mixing system of claim 2, wherein the motor is configured to rotate the rotor at less than 50 RPM.

4. The mixing system of claim 1, wherein the motor is configured to rotate the rotor at less than 100 RPM such that the rotor mixes the solution at a shear rate of greater than 120 reciprocal seconds.

5. The mixing system of claim 1, further comprising:

a plate rotationally coupled to an end of the rotor, the plate defining a plurality of teeth that extend therefrom along a longitudinal direction; and a stator positioned within the mixing chamber and defining a plurality of teeth extending therefrom towards the plate such that at least some of the teeth of the plate and stator are disposed between one another.

6. The mixing system of claim 1, wherein the rotor has an outer curved surface, and the outer curved surface and the manifold are configured such that the shear rate between the outer curved surface and the manifold would be greater than 100 reciprocal seconds when the rotor rotates at less than 100 RPM.

7. The mixing system of claim 6, wherein the rotor has a plurality of teeth extending out from the outer curved surface of the rotor;

wherein each tooth extends from a base to a tip and defines a front surface with a surface area, a rear surface opposite the front surface along a longitudinal direction, a first side surface, and a second side surface opposite the first side surface along a circumferential direction;

wherein a gap is defined between adjacent ones of the teeth along the circumferential direction, the gap having a cross-sectional area measured along a plane perpendicular to a longitudinal axis that extends in the longitudinal direction; and wherein a ratio of the surface area of the front surface to the cross-sectional area of the gap is less than 0.6.

8. A method of mixing a solution comprising a liquid adhesive and a gas in a mixing system, the method comprising:

receiving the solution in a mixing chamber of the mixing system; and rotating a rotor of the mixing system within the mixing chamber at less than 100 revolutions per minute (RPM) such that the rotor mixes the solution at a shear rate of greater than 100 reciprocal seconds.

9. The method of claim 8, wherein the rotating step comprises rotating the rotor at less than 75 RPM such that the rotor mixes the solution at a shear rate of greater than 100 reciprocal seconds.

10. The method of claim 8, wherein the rotating step comprises rotating the rotor at less than 50 RPM.

11. The method of claim 8, wherein the rotating step comprise rotating the rotor at less than 100 RPM such that the rotor mixes the solution at a shear rate of greater than 120 reciprocal seconds.

12. The method of claim 11, wherein the rotating step comprise rotating the rotor so as to mix the solution at a shear rate of greater than 140 reciprocal seconds.

13. The method of claim 8, wherein the mixing system comprises a stator having teeth extending therefrom, an end of the rotor comprises a plate with teeth therefrom towards the stator, and the rotating step comprises rotating the plate with the rotor so as to cause at least some of the teeth of the plate to rotate between the teeth of a stator.

14. The method of claim 8, wherein the rotor has an outer curved surface, and the outer curved surface and a manifold, of the mixing system, are configured such that the shear rate between the outer curved surface and the manifold would be greater than 100 reciprocal seconds when the rotor rotates at less than 100 RPM; and wherein the rotor rotates at less than 100 RPM, and the shear rate between the outer curved surface and the manifold is greater than 100 reciprocal seconds when the rotor rotates at less than 100 RPM.

15. A mixing system configured to mix liquid adhesive and gas to create a solution, the mixing system comprising:

a manifold defining an adhesive input configured to receive the liquid adhesive, a gas input configured to receive the gas, a mixing chamber in fluid communication with the liquid adhesive and gas inputs, an output configured to output the solution, and an output passage extending from the mixing chamber to the output;

a rotor having an outer surface that is curved about a longitudinal axis that extends in a longitudinal direction, the rotor having a plurality of teeth extending out from the outer curved surface;

a motor configured to rotate the rotor within the mixing chamber about the longitudinal axis so as to mix the solution;

a plate rotationally fixed to an end of the rotor, the plate defining a plurality of teeth that extend therefrom along a longitudinal direction; and a stator positioned within the mixing chamber and defining a plurality of teeth extending therefrom along the longitudinal direction towards the plate such that at least some of the teeth of the plate and stator are disposed between one another;

wherein each tooth of the rotor extends from a base to a tip and defines a front surface, a rear surface opposite the front surface along a longitudinal direction, a first side surface, and a second side surface opposite the first side surface along a circumferential direction;

wherein the front surface has a surface area;

wherein a gap is defined between adjacent ones of the teeth of the rotor along the circumferential direction, the gap having a cross-sectional area; and wherein a ratio of the surface area of the front surface to the cross-sectional area of the gap is less than 0.5.

16. The mixing system of claim 15, wherein the surface area of the front surface is less than 0.003 square inches, wherein the cross-sectional area of the gap is greater than 0.004 square inches measured along a plane perpendicular to the longitudinal axis, and wherein each tooth defines a height from the base to the tip that is less than 0.2 inches.

17. The mixing system of claim 15, wherein the first and second side surfaces are offset by an angle between 10 and 50 degrees.

18. The mixing system of claim 15, wherein at least 1,000 teeth extending radially outwards from the outer surface.

19. The mixing system of claim 15, wherein the motor is configured to rotate the rotor at less than 100 revolutions per minute (RPM) such that the rotor mixes the solution at a shear rate of greater than 100 reciprocal seconds.

20. The mixing system of claim 7, wherein the surface area of the front surface is less than 0.003 square inches;

wherein the cross-sectional area of the gap is greater than 0.004 square inches measured along a plane perpendicular to the longitudinal axis; and wherein each tooth defines a height from the base to the tip that is less than 0.2 inches.

* * * * *